United States Patent [19]

Harper

[11] Patent Number: 5,629,379
[45] Date of Patent: May 13, 1997

[54] ANHYDRIDE-HARDENED EPOXY RESIN WITH POLYBUTADIENE-MALEIC ANHYDRIDE ADDUCT

[76] Inventor: John D. Harper, 6475-B Pacific Coast Hwy., Long Beach, Calif. 90803

[21] Appl. No.: 540,132

[22] Filed: Oct. 6, 1995

Related U.S. Application Data

[63] Continuation-in-part of Ser. No. 312,827, Sep. 27, 1994.
[51] Int. Cl.$^6$ .................................................. C08L 63/00
[52] U.S. Cl. ............................................ 525/65; 525/114
[58] Field of Search ........................ 525/65, 117, 114

[56] References Cited

U.S. PATENT DOCUMENTS

| | | | |
|---|---|---|---|
| 4,028,432 | 6/1977 | Dawans et al. | 528/112 |
| 4,900,848 | 2/1990 | Saito et al. | 528/96 |
| 5,091,498 | 2/1992 | Arduengo, III et al. | 528/90 |
| 5,324,767 | 6/1994 | Koyama et al. | 523/443 |

FOREIGN PATENT DOCUMENTS

| | | |
|---|---|---|
| 56-59838 | 5/1981 | Japan . |
| 56-74117 | 6/1981 | Japan . |
| 62-292826 | 12/1987 | Japan . |
| 4-236214 | 8/1992 | Japan . |
| 6-157722 | 6/1994 | Japan . |

*Primary Examiner*—Robert E. Sellers
*Attorney, Agent, or Firm*—Thomas A. Schenach

[57] ABSTRACT

Toughened epoxy resin systems having high temperature capabilities of from 250° to 350° C. prepared by carefully curing blends of epoxy resins having an average epoxy functionality greater than two with bicycloalkene dicarboxylic anhydride hardener, maleinized polybutadiene toughening agent, supplemental hardener selected from the group consisting of aromatic tetracarboxylic dianhydrides and bis-maleimides of aromatic diamines, and epoxy/anhydride accelerator.

8 Claims, No Drawings

ANHYDRIDE-HARDENED EPOXY RESIN WITH POLYBUTADIENE-MALEIC ANHYDRIDE ADDUCT

This application is a continuation-in-part of application Ser. No. 08/312,827, filed Sep. 27, 1994, pending, by John D. Harper.

BACKGROUND

This invention relates to epoxy resins, and, more particularly, to improved epoxy resin systems having outstanding high temperature properties and increased toughness in comparison to prior art epoxy resin systems and especially useful therefore for aerospace and other advanced composites.

Because of their chemical resistance, physical properties, ease of processing, and ability to adhere well to a variety of substrates, fillers, and reinforcing agents, epoxy resins have been used for over forty years for applications such as composites, adhesives and sealants, filament winding, potting compounds, and the like. By definition, any molecule containing the epoxy group,

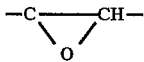

can be called an epoxy. Many commonly used epoxy resins are based on the glycidyl group,

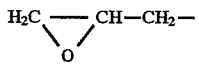

which can be introduced into a molecule containing hydroxyl —OH or amino —NH$_2$ by reaction with epichlorohydrin—for example, the diglycidyl ether of bis (hydroxyphenyl)propane or other bisphenols, triglycidyl p-aminophenol, tetraglycidylmethylene dianiline, and the like. Also used are glycidyl ethers of phenol-formaldehyde condensates (novolacs). Another route to epoxy resins is the epoxidation of olefinic unsaturation in compounds such as the cyclohexenylmethyl ester of cyclohexene carboxylic acid. In the formulation of an epoxy resin system, two properties of the epoxy resin are essential—the epoxy functionality (that is, the number of epoxy groups per molecule) and the epoxy equivalent weight (that is, the number of grams of epoxy resin which contain one chemical equivalent of epoxy group). As an example triglycidyl p-aminophenol has an epoxy functionality of three (3 epoxy groups per molecule) and an epoxy equivalent weight of 110. Functionality and equivalent weight are concepts familiar to any chemist.

Epoxy resins can be homopolymerized to polyethers by the use of Lewis acid catalysts such as boron trifluoride and Lewis base catalysts such as tertiary amines, ethyl methyl imidazole, or dicyandiamide. These catalysts are conventionally referred to as epoxy curing agents or hardening agents or simply hardeners, and are used in relatively low concentrations relative to the epoxy resin. It is more common, however, to employ hardeners which actually react with the epoxy group and become a part of the final cured solid epoxy resin. The most commonly used "co-reactant" type hardeners are the diamines and polyamines such as diethylenetriamine and methylene dianiline, and the carboxylic acid anhydrides such as phthalic anhydride, methyl tetrahydrophthalic anhydride, and methyl bicyclo- heptenedicarboxylic acid anhydride (commonly known as Nadic methyl anhydride). Just as one refers to the epoxy equivalent weight, one also refers to an amine equivalent weight or an anhydride equivalent weight—the number of grams of hardener which contain one chemical equivalent of amine hydrogen or anhydride respectively. In theory, one epoxy equivalent weight will react completely with one hardener equivalent weight to form the final solid cured resin. This is referred to as a stoichiometry (or stoichiometric ratio) of one to one. In actual practice, the epoxy resin component will often be used in excess of the amount predicted from the epoxy and hardener equivalent weights. For example one might use a stoichiometry of 0.8 equivalents of hardener to one equivalent of epoxy resin.

It is common practice in the art to separate the components of an epoxy resin system into a "Part A" containing the epoxy resin or resins and a "Part B" containing the hardener or hardeners. This approach has two advantages. First, curing of the epoxy resin system cannot begin until the epoxy resin component and the hardener component are mixed together—in this two-part form, the system is indefinitely stable. Moreover the amount of epoxy resin in Part A and the amount of hardener in Part B are chosen by the supplier to provide the desired stoichiometry once they are blended together by the customer. This is a considerable benefit for customers who are not themselves chemists and might therefore have difficulties in understanding and working with functionality, equivalent weights, and the like.

Once the epoxy resin and hardener are mixed, reaction will begin, leading eventually to a solid resin. The reaction however may proceed extremely slowly, especially when anhydrides are being employed as the hardeners. In order to speed up sluggish reactions, catalysts called epoxy accelerators are often added in small amounts. Tertiary amines such as benzyl dimethyl amine and Lewis bases such as ethyl methyl imidazole are useful accelerators for epoxy/anhydride systems. Lewis acids such as boron trifluoride may also be used. A new family of epoxy/anhydride accelerators, the 1,3-dialkylimidazole-2-thiones disclosed and claimed by Arduengo III, Barsotti, and Corcoran in U.S. Pat. No. 5,091,498, have been found to be extremely useful in accelerating epoxy/anhydride cures even at mild or ambient temperatures.

However, even with the addition of accelerators, it is customary to use heat in advancing the cure of epoxy resin systems. Cures are often carried out in stepwise fashion—the original blend of epoxy resin, hardener, and other ingredients is heated at a relatively low temperature at first in a preliminary cure, followed by subsequent heating at one or two higher temperatures. In order to establish the optimum cure cycle for a given epoxy resin system, a variety of laboratory techniques can be used to follow the progress of the polymerization and determine when cure is complete. The preliminary curing step is often carried out until the original blend, usually liquid, has gelled. From then on, more sophisticated test methods such as differential scanning calorimetry (DSC), thermal mechanical analysis (TMA), dielectric analysis, and infrared analysis (IR), can be employed to monitor the remainder of the cure. Once a satisfactory cure cycle has been worked out for a specific epoxy resin system, it is usually unnecessary to repeat the more complicated laboratory monitoring with subsequent batches that are to be cured. Conventionally, the supplier of the epoxy resin system will provide customers both with suggested ratios of epoxy resin to hardener and with suggested cure cycles that the customer can carry out without the need for elaborate laboratory testing.

In addition to the epoxy resin, hardener, and accelerator, it is well known in the art to include minor amounts of other ingredients in an epoxy resin system to facilitate processing or improve final solid resin properties. Among said minor ingredients are defoamants ("bubble breakers"), leveling agents, and the like. Selection of said ingredients for such purposes is within the skill of the ordinary worker.

FIELD OF THE INVENTION

Epoxy resin systems have proved to be useful in a wide variety of applications. However the performance of conventional epoxies in two particular areas limits their utility in demanding applications such as the manufacture of aerospace composites. One of these areas in which prior art epoxy resin systems tend to be deficient is that of high temperature capability. Whereas epoxies are normally regarded as having good high temperature properties, it is unusual to find an epoxy resin system capable of being used at temperatures in excess of 200° C. as measured by glass transition temperature $T_g$, heat distortion temperature HDT, or other laboratory tests. Aerospace composites, however, are usually required to perform their intended function at temperatures above 200° C. and frequently above 300° C., well beyond the normal upper temperature limits of conventional prior art epoxy resin systems. As a result, aerospace composites are usually manufactured from other resin systems such as the polyimides, which can be used in the 250°-350° C. range. The aerospace industry has long desired a resin system which combines the high temperature capability of the polyimides with the ease of processing which is one of the outstanding attributes of epoxy resin systems. Curing of polyimide resin systems requires not only heat but also high pressure, plus the use of vacuum bagging or similar techniques to remove volatile byproducts of the polyimide curing which would otherwise leave voids in the final cured resin. In contrast, epoxy resin systems generate few if any volatile byproducts and can be cured by the application of heat alone. However the high temperature deficiencies of epoxies has heretofor limited their use in aerospace composites.

It has been possible to create cured epoxy resins with high temperature capabilities above 200° C. by the use of epoxy resin and hardener starting materials which are capable of extensive crosslinking. However too high a degree of crosslinking ("crosslink density") in an epoxy resin system often leads to brittleness in the final cured resin. Brittleness in an epoxy system can be reduced by the incorporation therein of a so-called flexibilizer such as the diglycidyl ester of linoleic acid dimer, or by addition of a small amount of a rubber plasticizer such as carboxy-terminated butadiene-acrylonitrile (CTBN) rubber. Flexibilizers and plasticizers reduce brittleness in a final cured epoxy resin but may also reduce the strength of the resin, and even reduce its glass transition temperature. Moreover, whereas increased flexibility may be desirable in applications such as coatings and flexible tubing, it is undesirable in many aerospace and other advanced composites wherein strength and rigidity are required. Resins suitable for these applications need what has become known in the art as toughness—hardness without brittleness. For many years, workers in the field have sought means of increasing the toughness of epoxy resin systems without seriously compromising other resin properties, especially high temperature capability. Two years ago, a family of toughened epoxy resin systems was introduced by this inventor. These systems were based on diglycidyl bis(hydroxyphenyl) propane as the epoxy resin and methyl tetrahydrophthalic anhydride as the hardener, modified by the addition of a maleic anhydride adduct of a 1,2-polybutadiene as a toughening additive. These resins, marketed under the trade name "Tufpoxy", exhibited improved toughness as measured by the unnotched Izod test without lowering of the glass transition temperature $T_g$ and without a serious loss of other desirable resin characteristics. However the high temperature capabilities of the Tufpoxy systems, while adequate for most epoxy resin uses, were still far too low to be useful in aerospace composite applications. In general, the Tufpoxy resins had glass transition temperatures of about 130° C. to 140° C.—far below the 250°-350° C. range required for aerospace use.

Until my discovery of the toughened epoxy resin systems disclosed and claimed in my copending application Ser. No. 08/312,827 filed Sep. 27, 1994, pending, the contents of which are incorporated herein by reference, and the modifications in said systems disclosed in Ser. No. 08/312,827 and also disclosed and claimed in the instant Application, I was not aware of the existence of an anhydride-hardened epoxy resin system possessing both toughness and high temperature capabilities in the 250° to 350° C. range.

SUMMARY OF THE INVENTION

I have now discovered that toughened epoxy resin systems can be prepared having glass transition temperatures $T_g$ in the 250° to 350° C. range similar to those of polyimide aerospace resins while maintaining the ease of processing characteristics of prior art epoxy resin systems. I have found that these results can be obtained by limiting the functionality of the epoxy resin component, by limiting the selection of the main anhydride hardener component, and the controlling the stoichiometry of the reaction mixture and the cure cycle. I have further found that the high temperature capability of my toughened epoxy resins can be further improved by the addition of a supplemental hardening agent to the original epoxy resin/anhydride hardener blend. Specifically, the toughed high temperature epoxy resin systems of the instant invention are prepared from a blend of the following components:

(1) An epoxy resin component selected from the group consisting of
   (a) a single epoxy resin having an epoxy functionality greater than two epoxy groups per molecule; and
   (b) a mixture of epoxy resins so chosen that all of the epoxy resins in said mixture have an epoxy functionality of at least two epoxy groups per molecule, and that the average epoxy functionality of said mixture is greater than two epoxy groups per molecule;

(2) An anhydride hardener component consisting essentially of a mixture of
   (a) A bicycloalkene dicarboxylic acid anhydride and
   (b) A 1,2-polybutadiene-maleic anhydride adduct containing from about 15 to 25% combined maleic anhydride and having an equivalent weight in the range of about 400 to 700;

(3) A supplemental hardener component selected from the group consisting of
   (a) an aromatic tetracarboxylic acid dianhydride and
   (b) a bis(maleimide) of an aromatic diamine;

(4) An epoxy/anhydride accelerator selected from the group consisting of dialkyl imidazolethiones, dialkylimidazoles, tertiary amines, dicyandiamide, and Lewis bases, and mixtures thereof, and alternately Lewis acids.

These blends are subjected to a preliminary cure at from about 80° C. to 120° C. till they have gelled. The gelled blend is then subjected to further curing at from about 200°

C. to 300° C. until the cure is complete in order to obtain the final toughened high-temperature resin.

Additionally, I have found, unexpectedly, that a 1,2-polybutadiene resin can be incorporated into the blends of my invention without a sacrifice in high temperature capabilities as measured by $T_g$. Normally a 1,2-polybutadiene resin would not be expected to be compatible in and reactive with an epoxy/anhydride system (unless it contained adducted maleic anhydride as with (2)(b).) Surprisingly, however, a 1,2-polybutadiene is acceptable as a supplemental toughening agent in the blends of my invention.

My invention will now be described in greater detail.

DETAILED DESCRIPTION OF THE INVENTION

The epoxy resin component (1)

A single epoxy resin could be used as the epoxy resin components of my invention, provided that it has more than two epoxy groups per molecule. Suitable epoxy resins include triglycidyl p-aminophenol, glycidyl ethers of novolacs with epoxy functionality greater than two, and tetraglycidyl methylene dianiline. Alkyl-substituted glycidyl aminophenols are disclosed by Saito, Watanabe, Okuno, Kamio, Morii, and Nakamura, U.S. Pat. No. 4,900,848, which are low in viscosity and easy to blend into epoxy systems; and such epoxy resins (functionality 3) would be useful in my invention. Alternately, mixtures of epoxy resins can be used, provided that no epoxy resin therein has a functionality less than two epoxy groups per molecule, and that the average epoxy functionality of the mixture is greater than two. Suitable mixtures include combinations of triglycidyl p-aminophenol (functionality 3) with diglycidyl bis (hydroxyphenyl)propane (functionality 2) or the bis (epoxide) of cyclohexenylmethyl cyclohexenecarboxylate (functionality 2). Whereas some improvement in high temperature capabilities can be achieved with an average epoxy functionality as low as 2.1, it is preferred that the average epoxy functionality be at least 2.5. Glycidyl ethers of phenol- and cresol-formaldehyde condensates (novolacs) have been prepared with 6 to 7 epoxy groups per molecule, but they are often solids or highly viscous liquids, more difficult to handle, and therefore less desirable. It is preferred that the epoxy functionality of the epoxy resin component (1) be no higher than four.

The anhydride hardener component (2)

The primary anhydride hardener component (2)(a) of my invention is a bicycloalkene dicarboxylic acid anhydride, preferably either methyl bicycloheptene dicarboxylic acid anhydride (known in the trade as "Nadic methyl anhydride" or "NMA") and bicycloheptene dicarboxylic acid anhydride (known in the trade as "Himic anhydride"). These bicyclic anhydrides are prepared by the condensation of maleic anhydride with methylcyclopentadiene or cyclopentadiene respectively. Many well known anhydride hardeners in the art are monocycloalkene dicarboxylic acid anhydrides—for example, methyl tetrahydrophthalic anhydride. However not only do they not produce the outstanding high temperature capabilities shown by resins prepared from the bicycloalkene dicarboxylic acid anhydrides. But they actually seem to exert a negative effect on glass transition temperature when incorporated into the blends of my invention. Mixtures of Nadic methyl anhydride with methyl tetrahydrophthalic anhydride give $T_g$s well below 200° C., similar to those obtained when methyl tetrahydrophthalic anhydride is used by itself. Evidently the bicycloalkene-structure of my anhydride hardener component (2)(a) is essential to achieving the desired high temperature capabilities of my resins.

A second anhydride hardener component (2)(b) is used in my invention in order to achieve toughness in the final cured resin. 1,2-Polybutadiene resins having molecular weights of from 1000 to 4000 have the ability to react with maleic anhydride to form adducts (often called maleinized polybutadienes) in which the anhydride moiety of the maleic anhydride is retained. Such maleinized polybutadienes are therefore anhydrides and can function as anhydride hardeners in combination with the bicycloheptene dicarboxylic acid anhydride (2)(a). As small an amount as one equivalent of maleinized polybutadiene with 75 equivalents of bicycloheptene dicarboxylic acid anhydride will exert an improvement in the toughness of the final cured resins of my invention. But it is preferred to use a stoichiometry of 15 equivalents (2)(a) to 1 equivalent (2)(b), or even two equivalents of (2)(a) to 1 equivalent (2)(b). Several grades of maleinized polybutadiene are available in the market, differing in maleic anhydride content. For the resin systems of my invention, a maleinized polybutadiene having a maleic anhydride content of from about 15 to 25% and having an equivalent weight of from about 400 to 700 is preferred. Polybutadienes having lower maleic anhydride contents do not give the desired improvement.

However, as already noted, an unmaleinized 1,2-polybutadiene can be used in combination with the maleinized polybutadiene (2)(b) as a supplemental toughening agent. An amount of unmaleinized 1,2-polybutadiene from 1 to 150% of the amount of maleinized polybutadiene (2)(b) may be added.

The stoichiometric ratio of combined anhydride hardeners (2)(a) plus (2)(b) to epoxy resin component (1) should be between 0.7 to 1 equivalent of combined anhydrides to one equivalent of epoxy resin component.

The supplemental hardener component (3)

The supplemental hardener component of my invention is selected from the group consisting of (a) aromatic tetracarboxylic acid dianhydrides and (b) bis(maleimides) of aromatic diamines. A preferred aromatic tetracarboxylic acid dianhydride (a) is the dianhydride of benzophenone tetracarboxylic acid. This dianhydride has long been known as an anhydride hardener for epoxy resin systems, leading to final resins with good high temperature properties. However, inasmuch as it is a solid with a high melting point (220°–230° C.), it is normally troublesome to work with in comparison with liquid anhydride hardeners such as Nadic methyl anhydride. It is easily compatible with the blends of my invention, however, and, added in an amount equal to from 1% to 100% by weight of bicycloalkene dicarboxylic acid anhydride (2)(a), it imparts a significant improvement in the high temperature capabilities of the final cured resins. Pyromellitic dianhydride is another aromatic tetracarboxylic acid dianhydride useful as a supplemental hardener in my invention.

Aromatic diamines such as methylene dianiline react with maleic anhydride to form bis(maleimides), and these are also useful as supplemental hardeners (3)(b) in my invention. The bis(maleimide) is added in an amount of from 1 to 25% of the total mixture. The imide group, —C(=O)—N(R)—C(=O)— is the nitrogen analog of the anhydride group, —C(=O)—O—C(=O)—, and perhaps the imide and anhydride groups act similarly in reacting with and hardening the epoxy resin component (1). Alternately, the olefinic unsaturation in the maleic portion of the bis(maleimide) may undergo reaction; or perhaps both mechanisms of reaction occur. Whatever the mechanism, the effect of the bis (maleimide) on the high temperature capability of the final resins of my invention is significant and unobvious.

Whereas it might be possible to incorporate both supplemental hardeners (3)(a) and (3)(b) into the same blend, no advantage is seen in doing so.

The epoxy/anhydride accelerator (4)

The epoxy/anhydride accelerator for my invention is selected from catalysts well known in the art, and is used at a level of from about 0.1 to 5% of the total weight of the blend. Choice of accelerator is considered to be within the skill of the worker in the art. However, as already noted hereinabove, the imidazole-2-thiones of Arduengo III et al. U.S. Pat. No. 5,091,498 are preferred. Mixtures of accelerators can be used provided that they are compatible with one another. (Clearly one would not mix a Lewis base accelerator with a Lewis acid accelerator, for example.)

The cure cycle

In order to obtain the high temperature capabilities in the resins of my invention, it is important to carry out a preliminary cure of the starting blend of ingredients (1) through (4) until the initial liquid mixture has gelled. This preliminary cure is carried out at from about 80° C. to 120° C. and may require from about 15 minutes to an hour or more, depending on the choice of components used. Once the mixture has gelled, it is subjected to further cure at from about 200° C. to 300° C. until the polymerization reaction is complete. The progress of the cure may be monitored by differential scanning calorimetry (DSC), thermal mechanical analysis (TMA), or other laboratory techniques as noted hereinabove. The final toughened solid resin will have a glass transition temperature in the range of from about 250° C. to 350° C., and more usually in the 300°-350° C. range. This $T_g$ value is that for the neat unfilled and non-reinforced resin system. (It is common in the art to find high temperature data reported for resins which have already been incorporated into molding compounds, composites, and the like and contain substantial quantities of fillers, reinforcing agents, etc.) Depending on the selection of starting materials, the final cured neat resin of my invention may be clear, hazy, or opaque. The epoxy resin systems of my invention may be handled as ordinary epoxies for use in the manufacture of composites, adhesives, and other epoxy-type applications, especially when toughness and high temperature capabilities are required.

My invention may be illustrated by the following Examples.

EXAMPLE 1

To a blend of 53 grams (0.48 equivalents) of triglycidyl p-aminophenol and 40 grams (0.29 equivalents) of epoxidized cyclohexenylmethyl cyclohexenecarboxylate was added a blend of 116 grams (0.64 equivalents) Nadic methyl anhydride, 20 grams (0.04 equivalents) of a maleinized 1,2-polybutadiene having an equivalent weight of 490 and a maleic anhydride content of 20%, and 8 grams (0.05 equivalents) of benzophenone tetracarboxylic acid dianhydride. Three grams of methyl propyl imidazole-2-thione accelerator were added, and the resulting liquid blend subjected to preliminary cure at 85° C. for thirty minutes till it had completely gelled. It was then further cured at 200° C. to 300° C. till reaction was complete. The resulting clear dark toughened resin had a glass transition temperature $T_g$ of 316° C.

EXAMPLE 2

To a blend of 57 grams (0.52 equivalents) of triglycidyl p-aminophenol and 41 grams (0.3 equivalents) of epoxidized cyclohexenylmethyl cyclohexenecarboxylate was added 126 grams (0.7 equivalents) Nadic methyl anhydride, 20 grams (0.04 equivalents) of maleinized polybutadiene as in Example 1, and 18 grams of the bis(maleimide) of methylene dianiline. Three grams of methyl propyl imidazole-2-thione were added, and the resulting liquid blend was cured in the same manner as the blend in Example 1. When curing was complete the final toughened solid resin had a glass transition temperature $T_g$ of 321° C.

These Examples are by way of illustration only, and are not meant to be limiting within the scope of the following claims.

I claim:

1. A toughened epoxy resin system having a glass transition temperature of from about 250° C. to 350° C., said resin system being prepared from a blend comprising the following ingredients:

(1) An epoxy resin component selected from the group consisting of
 (a) a single epoxy resin having an epoxy functionality greater than two epoxy groups per molecule; and
 (b) a mixture of epoxy resins so chosen that all epoxy resins in said mixture have epoxy functionality of at least two epoxy groups per molecule, and that the average epoxy functionality of said mixture is greater than two epoxy groups per molecule;

(2) An anhydride hardener component consisting essentially of
 (a) a bicyclo alkene dicarboxylic acid anhydride; and
 (b) a 1,2-polybutadiene-maleic anhydride adduct containing from about 15 to 25% combined maleic anhydride and having an equivalent weight in the range of from about 400 to 700;

the stoichiometric ratio of anhydride hardener (2)(a) to (2)(b) being from 75 to 1 equivalents to 2 to 1 equivalents; and the stoichiometric ratio of said anhydrides (2)(a) and (2)(b) combined to said epoxy resin component (1) being from about 0.7 to 1 equivalent to 1 to 1 equivalent;

(3) A supplemental hardener component selected from the group consisting of
 (a) an aromatic tetracarboxylic acid dianhydride in an amount of from 1% to 100% by weight of said bicyclo alkene dicarboxylic acid anhydride component (2)(a); and
 (b) an aromatic diamine bis(maleimide) in an amount of from 1% to 25% of the total mixture;

(4) An epoxy/anhydride accelerator selected from the group consisting of dialkyl imidazole-2-thiones, dialkylimidazoles, tertiary amines, dicyandiamide, Lewis bases, and mixtures thereof, and alternately Lewis acids, said blend being subjected to preliminary curing at from about 80° C. to 120° C. till said blend has gelled, and then to further curing at temperatures of from 200° C. to 300° C. till curing is complete, thereby obtaining final toughened solid epoxy resin.

2. An epoxy resin system according to claim 1 wherein epoxy resin component (1) is a mixture of triglycidyl p-aminophenol and epoxidized cyclohexenylmethyl cyclohexenecarboxylate.

3. An epoxy resin system according to claim 2 wherein anhydride hardener (2)(a) is Nadic methyl anhydride.

4. An epoxy resin system according to claim 3 wherein supplemental hardener (3)(a) is benzophenone tetracarboxylic acid dianhydride.

5. An epoxy resin system according to claim 3 wherein supplemental hardener (3)(b) is the bis(maleimide) of methylene dianiline.

6. An epoxy resin system according to claim 3 wherein epoxy accelerator (4) is methyl propyl imidazole-2-thione.

7. A toughened epoxy resin system according to claim 1 having a glass transition temperature of 316° C. prepared by blending 0.48 equivalents of triglycidyl p-aminophenol, 0.29 equivalents of epoxidized cyclohexenylmethyl cyclohexenecarboxylate, 0.64 equivalents of Nadic methyl anhydride, 0.04 equivalents of polybutadiene-maleic anhydride adduct having an equivalent weight of 490 and a maleic anhydride content of 20%, 0.05 equivalents of benzophenone tetracarboxylic acid dianhydride, and 1.3 weight % of methyl propyl imidazole-2-thione, subjecting said blend to preliminary curing at 85° C. till gellation is complete, and then further subjecting said blend to curing at 200° to 300° C. till reaction is complete, thereby obtaining toughened solid resin.

8. A toughened epoxy resin system according to claim 1 having a glass transition temperature of 321° C. prepared by blending 0.52 equivalents of triglycidyl p-aminophenol, 0.3 equivalents of epoxidized cyclohexenylmethyl cyclohexenecarboxylate, 0.7 equivalents of Nadic methyl anhydride, 0.04 equivalents of polybutadiene-maleic anhydride adduct having an equivalent weight of 490 and a maleic anhydride content of 20%, bis(maleimide) of methylene dianiline in an amount of 6.8% by weight of total blend, and 1.1% by weight of methyl propyl imidazole-2-thione, subjecting said blend to preliminary curing at 85° C. till gellation is complete, then further subjecting said blend to curing at 200° to 300° C. till reaction is complete, thereby obtaining toughened solid resin.

* * * * *